United States Patent

Herolf

[15] 3,690,352
[45] Sept. 12, 1972

[54] APPARATUS FOR DELIMBING TREES
[72] Inventor: Kjell Olof Gunnar Herolf, Sundsbruk, Sweden
[73] Assignee: Kockum Soderhamn AB, Fack, Sweden
[22] Filed: Sept. 14, 1970
[21] Appl. No.: 71,929

[30] Foreign Application Priority Data

Sept. 18, 1969 Sweden ............... 12891/69

[52] U.S. Cl. ............................................. 144/2 Z
[51] Int. Cl. ............................................. A01g 23/02
[58] Field of Search ....... 144/2 Z, 3 D, 34 R, 309 AC

[56] References Cited

UNITED STATES PATENTS

| | | |
|---|---|---|
| 2,612,724 | 10/1952 | Llewellyn...................144/2 Z |
| 3,385,331 | 5/1968 | Bronemo et al............144/2 Z |
| 3,489,190 | 1/1970 | Voronitsyn et al.........144/2 Z |

*Primary Examiner*—Gerald A. Dost
*Attorney*—Fred C. Philpitt

[57] ABSTRACT

A tree delimbing apparatus which includes elongated horizontally disposed members that are rotatable and which have cutting members disposed radially outwardly from the axis of rotation, said rotatable members also serving to space the tree trunks away from said cutting members.

17 Claims, 6 Drawing Figures

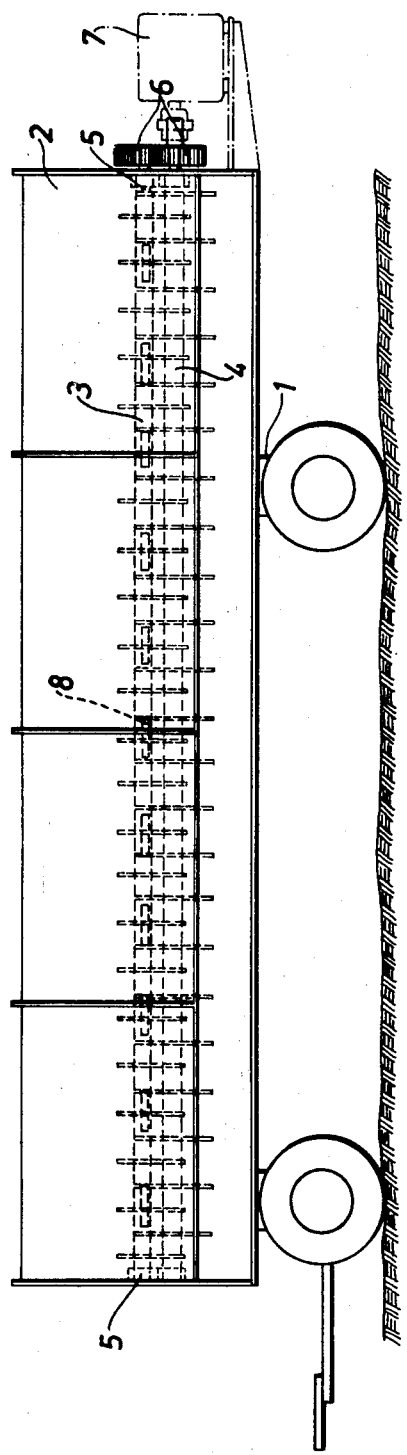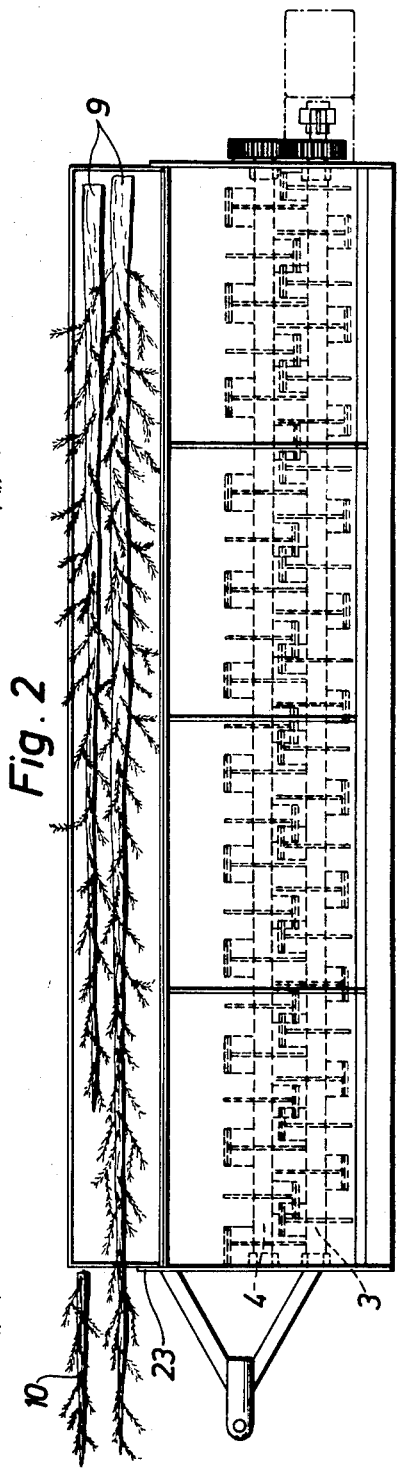

APPARATUS FOR DELIMBING TREES

In tree-harvesting the delimbing work on felled trees is an essential and time-consuming part of the upgrading operation, and for this reason many types of machines for branch removing purposes have been proposed during the years. According to one principle for the removal of the tree branches the felled trees are fed one by one in their direction of length through the delimbing machine which comprises delimbing members which are movable towards and from the tree trunk, and may consist of, for instance, knives or rotatable cutters each being swingable around an axis, the knives or cutters forming therebetween a space through which the tree can be fed in its direction of length so that during the passage of a tree through said space the tree is worked by the delimbing means. If desired, the delimbing members can be carried by a rotatable drum through which the tree is fed.

According to another proposition the delimbing operation is carried out before the tree is felled. An apparatus according to this principle consists of a holder surrounding the tree and delimbing members arranged on said holder, the holder being movable upwards and downwards along the tree, for instance along an elongated frame with driving means for displacement of the holder and for the movement of the delimbing means. Also in this type of delimbing machines means are necessary for effecting relative movement between the delimbing apparatus and the tree trunk in the direction of length of the latter, and the tree can be worked only one at a time.

In still another type of known means for delimbing felled trees the delimbing operation and the feeding of the tree in the machine is carried out by a reciprocable, the tree trunk surrounding unit with delimbing knives, said unit being movable along a frame. During the delimbing operation the tree is held unmovable relatively to the frame. The delimbing operation can also be carried out by means of an unmovable unit with delimbing knives which unit surrounds the tree trunk. In this case the tree is fed through an apparatus by means of feeding rollers.

Finally it has been proposed to carry out the delimbing work by means of one or more rotatable delimbing members which extend along the entire length of the tree or the part thereof corresponding to a desired length of the logs to be obtained. Such a delimbing apparatus is described in the U.S. Pat. No. 3 385 331.

The present invention relates to the latter type of delimbing machines in which the trees need not be fed into the machine in their direction of length but can be fed in the transverse direction, the delimbing operation being carried out in a very short time. In this machine several trees can be treated in the apparatus simultaneously which permits economic working in areas with small trees and economic thinning operation.

The present invention relates to an apparatus of the latter type and the object of the invention is to eliminate the existing drawbacks in the known apparatus and to obtain considerably higher working efficiency while decreasing the need for manual work. An advantage with the apparatus according to the invention is that it makes it possible to use simple, easily exchangeable delimbing members. An other advantage is that the risk for accidents is reduced which is of considerable importance in view of the high risk for accidents which is usually connected with the upgrading of felled trees. Still another advantage is that the machine can be fed by means of lifting trucks, cranes or the like and be controlled per radio by the operator on the lifting truck or the like. The delimbed trees can be fed out on the same side of the apparatus as that at which the trees are fed into the apparatus which facilitates the transportation of logs to and from the apparatus.

An apparatus according to the invention for delimbing trees comprises a frame and at least one elongated, rotatable delimbing tool carried by said frame and extending substantially parallel to the tree to be treated and provided with delimbing portions having cutting edges and being arranged at a distance from the axis or shaft of the delimbing tool and near the radially outer portion of supporting members secured to the shaft of the delimbing tool and serving as abutments against which the tree trunk can abut during the delimbing operation, and the apparatus is characterized in that at least the major portion of the support members has a small dimension in the direction of length of the shaft of a delimbing tool and that the support members are spaced apart from each other along the shaft of the tool, the delimbing portions extending essentially axially relatively to the delimbing tool and having their cutting edges directed essentially periferally relatively to the delimbing tool.

The invention will be described in more detail hereinbelow with reference to the accompanying drawings in which FIG. 1 shows the delimbing apparatus as seen from one side, FIG. 2 shows the apparatus as seen from above, FIG. 3 shows the apparatus in cross-section, said Fig. also showing the working principle for the apparatus, and FIGS. 4, 5 and 6 show details and sections of the delimbing tools.

The delimbing apparatus according to the drawings comprises a mobile frame or chassis 1 by means of which the apparatus can easily be transported between and over working places. A trough or house 2 is provided for receiving the trees to be delimbed and may be built as, for instance, a self-supporting construction and in such manner that it can be closed wholly or partly during the delimbing operation so that no branches or other objects can be threwn out and cause accidents. The purpose of the house 2 is also during the delimbing operation to hold the trees substantially parallel with each other and with the elongated delimbing tools 3 and 4. The delimbing tools 3 and 4 are rotated in mutually opposite directions and are carried by bearings in the ends 5 of the house. A gear transmission 6 is provided between the driving motor 7 and the delimbing tools. If the latter are extra long intermediate bearings 8 may be built in.

FIG. 2 shows the machine as seen from above and also shows two trees 9 one of which being too long so that it must be cut off by means of a knife 23 on the end portion of the house 2.

FIG. 3 shows a cross section of the apparatus according to FIGS. 1 and 2. The house 2 comprises a lower wall or plate 2a sloping downwardly to the right according to the figure and an upper wall or plate 2b which covers the delimbing tools 3 and 4. It also appears that a gripping means 11 of a truck can be used for carrying the trees 9 to be delimbed which trees are put on a wall 14 extending along the delimbing tools and swingably connected to the frame 1 by means of the axis 31. The wall 14 can be swung up from its lowest position shown in FIG. 3 by broken lines, whereafter the wall is swung forwardly and backwardly as indicated by the arrow 15. The tree will be rotated during the delimbing operation by means of the delimbing tools 3 and 4 the latter successively cutting off the branches of the trees so that the trees are finally fully delimbed. Thereafter the wall 14 is swung downwardly so that the delimbed tree trunks 12 fall down to the ground on the side of the apparatus where the trees were fed to the apparatus, whereupon the truck with the gripping means 11 can remove the delimbed trunks. The delimbing tools which rotate with a speed of 400–800 r/min, for instance 600 r/min, are provided with delimbing portions in the form exchangeable or removable knives 16 with sharp edges. There are also provided fixed cutting knives or counter-edges 17 at the upper wall 2b and 18 at the lower wall 2a, said fixed knives extending along the entire length of the house 2. The wall 14 is driven by the hydraulic motor 24. The branches 13 leave the apparatus at the opposite side thereof with respect to the side where the logs are fed to and from the apparatus.

FIG. 4 shows a portion of the delimbing tools 3 and 4 which comprise a shaft 33 and 34 respectively on which a predetermined number of substantially circular discs 20 are secured spaced from each other a suitable distance. On each disc is one or more cutting steels or knife means 16 provided. The cutting steels are provided at such a distance from the shaft of the delimbing tool that a free space is formed between the cutting steels and the shaft into which space the branches of the tree can enter to a considerable depth, for instance at least 2 cm, suitably at least 4 cm, preferably at least 7 cm, before they are cut off by said cutting steels.

The edge 16' of the cutting steels in the shown embodiment is directed in the peripheral direction of the delimbing tool but the edge can also be directed obliquely against said peripheral direction. The cutting steels 16 are screwed to a plate 21 which is supported by a plate 22 extending parallel with the delimbing tools and being fixed to the shafts 33 and 34 respectively. The cutting steels extend freely in an axial direction, on each side of the respective discs i.e. without being supported by the discs and substantially over an equal distance on each side of the disc. As appears from the drawing the discs of one delimbing tool are staggered relatively to the discs of the other delimbing tool a distance corresponding to half the distance between the discs on each tool. It also appears from FIG. 4 that the axial length of the cutting steels of one delimbing tool is considerably greater than the free space in the axial direction between the cutting steels of the other delimbing tool, so that the cutting steels of one tool "overlap" the cutting steels of the other tool in the axial direction, whereby all portions of the tree-trunk will be delimbed. The cutting edge 16' of the cutting steels can suitably be provided at equal or less distance from the center line of the shaft of the delimbing tools as compared with the periphery of the discs 20 whereby said steels are prevented from cutting into the wood of the tree trunk. Furthermore, the edge 16' can extend parallel with said central line, but this is not necessary since it can also cross the central line under a predetermined, preferably small angle. The periphery of the disc 20 is blunt and the tree trunk abuts against said periphery during the delimbing operation without being damaged.

Figure 3:
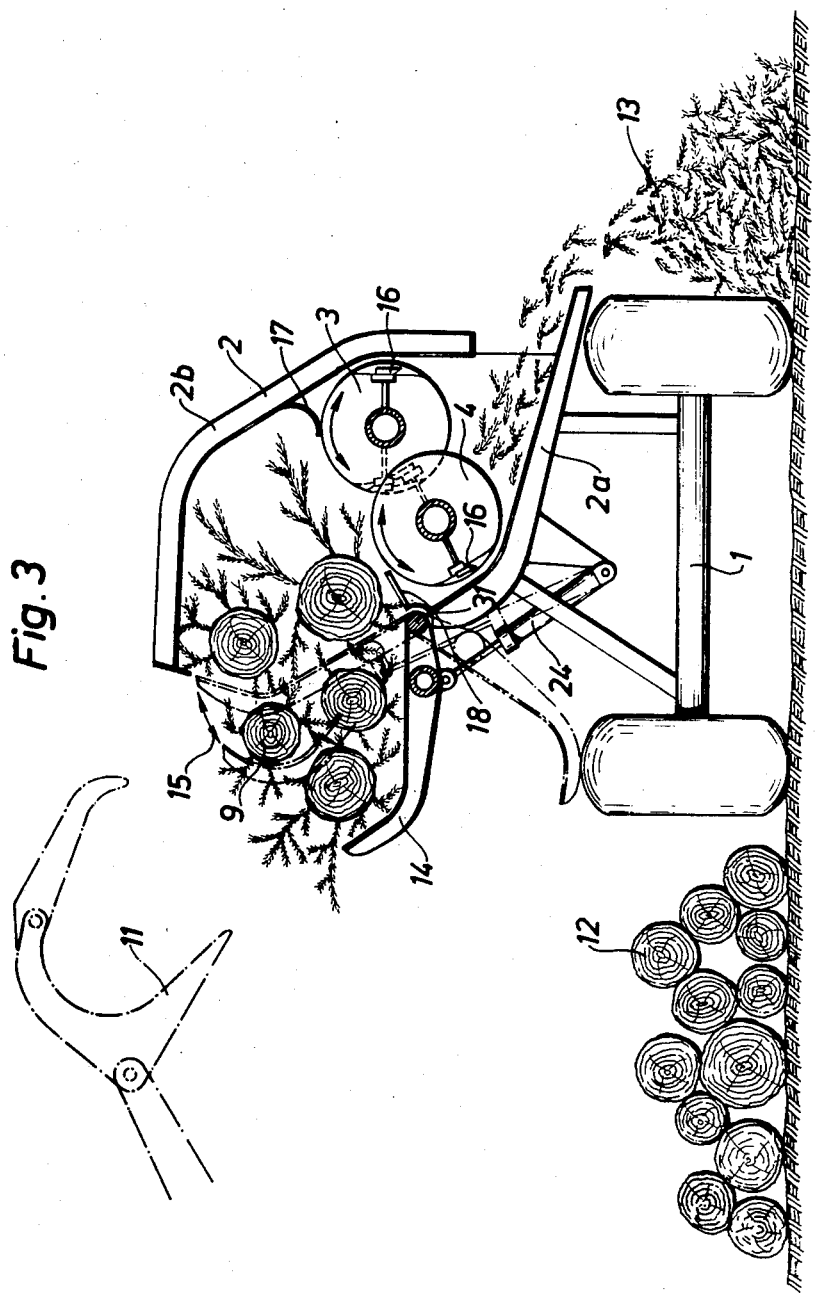
Figure 4:
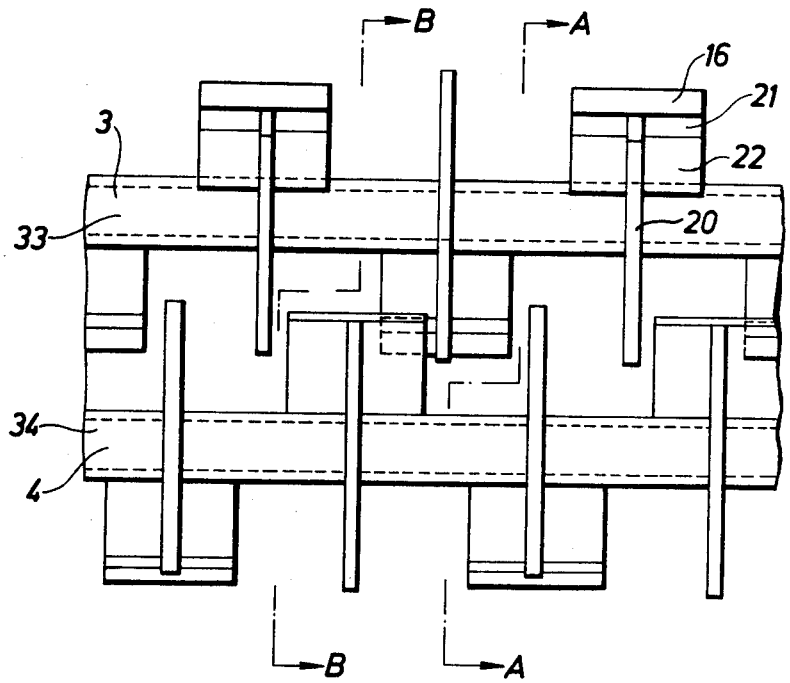
Figure 5:
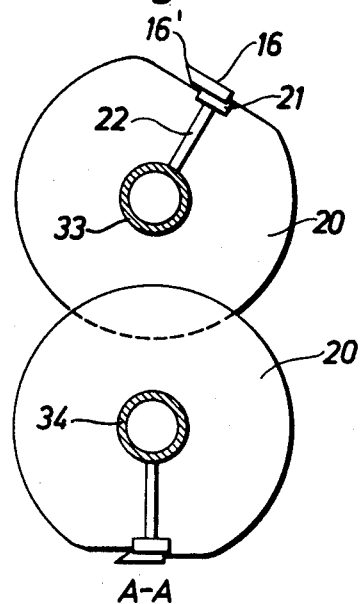
FIG. 5 shows a cross section B—B in FIG. 4 and it appears how two adjacent discs 20 on opposite delimbing tools are turned mutually nearly 180°.
Figure 6:
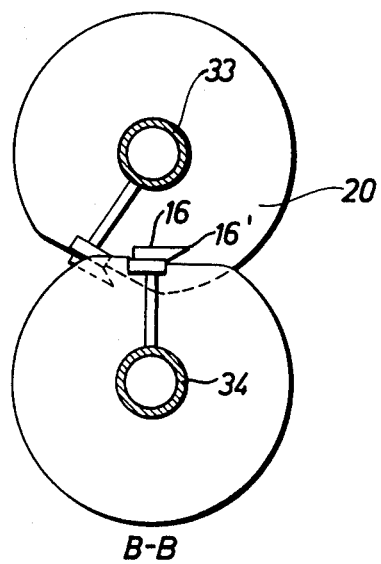
FIG. 6 shows a cross section A—A in FIG. 4 and it appears that two adjacent discs on one and the same delimbing tool are likewise turned 180° one relative to the other.

In both the latter cases the discs must not necessarily be turned 180° but other angles are possible. The essential thing is that the knife means of one delimbing tool go free with a required margin from the knife means of the other delimbing tool during the operation of the apparatus. It should also be pointed out that more than one knife means or cutting steel may be provided on one and the same disc 20. The wall 14 is swung upwardly and downwardly by means of one or more hydraulic motors 22 as mentioned above. Thereby the knives will cut off the top end 10 of a tree 9 if the tree is too long. The delimbing apparatus is suitably built with its frame in the form of a self-bearing or self-supporting construction and may, if desired, be built in modules which can be essembled to an apparatus having a length as oredered by the customer. Suitably the machine is mounted on a chassis which is supported by transportation wheels and with a driving machinery.

In the embodiment described the edges 16' extend substantially parallel with the axis of rotation of the delimbing tools. However, tests have shown that in certain cases it can be suitable to provide the edges at a certain angle to the center line of the axis of the delimbing tools and in such case the separate edges of one and the same tool may form together a broken screw line around the axis of the delimbing tool.

In certain cases it has shown to be suitable to provide the discs 20 with pins or teeth for more efficient tumbling of the logs during the delimbing operation. The distance between the discs is generally between 5 and 50 cm. The axial length of the cutting edges 16' can be somewhat less equal with or greater than the distance between the discs.

The swinging movement of the wall 14 by means of the hydraulic motors 24 is preferably carried out according to a predetermined program. However, the arrangement should be such that the operator of the loading truck has a possibility to intervene if troubles should occur.

The shown embodiment is not limiting for the invention since the latter does not exclude the use of equivalent means and arrangements by which the embodiment can be modified within the scope of the invention. In this connection it can be mentioned that in certain cases it can be sufficient to provide only one rotating delimbing tool in the apparatus. In such case the axial length of the knife means of cutting steels 16 suitably can be greater than the distance between the discs 20 and moreover each disc can be provided with more than one cutting steel.

What I claim is:

1. A tree delimbing apparatus comprising in combination:
   a. a supporting frame,
   b. at least one rotatable delimbing tool provided on said supporting frame, each delimbing tool comprising:
      1. an elongated and horizontally disposed shaft extending substantially parallel with the tree trunk to be delimbed,
      2. a plurality of radially extending trunk abutting members located at spaced apart intervals along the length of said shaft,
      3. the composite peripheral contour of said radially extending trunk abutting members presenting an abutment envelope which limits the proximity of tree trunks to said horizontally disposed shaft, and
      4. a plurality of spaced apart cutting members located radially outwardly from said horizontally disposed shaft adjacent the periphery of said abutment envelope, said cutting members including knives that extend essentially parallel to the axis of said horizontally disposed shaft.

2. An apparatus according to claim 1 wherein said cutting members are mounted at a substantial distance from each other along the periphery of delimbing tool.

3. An apparatus as set forth in claim 1, characterized in that said radially extending members have the shape of discs mounted around the shaft of the delimbing tool, the major portion of the circumference of the discs being circular and concentric with the shaft of the delimbing tool and serving as an abutment for the tree trunks during the delimbing operation.

4. An apparatus as set forth in claim 1 characterized in that said discs extend essentially perpendicularly to the axial direction of the delimbing tool.

5. An apparatus as set forth in claim 1 characterized in that the cutting member is a knife member that is exchangeably secured to a supporting plate.

6. An apparatus as set forth in claim 5 characterized in that the supporting plate is combined with an axially extending plate serving as holder for the support plate.

7. An apparatus as set forth in claim 1 characterized in that it comprises two delimbing tools disposed in a generally parallel relationship.

8. An apparatus as set forth in claim 7 characterized in that the cutting members of one delimbing tool are arranged to cooperate with the cutting members of the other delimbing tool during the delimbing operation.

9. An apparatus as set forth in claim 7 characterized in that the radially extending members of one delimbing tool are staggered between the radially extending members of the other delimbing tool along the length of the delimbing tools.

10. An apparatus as claimed in claim 7 characterized in that the delimbing tools are arranged to rotate in opposite directions.

11. An apparatus according to claim 1 wherein the cutting member of one radially extending member is radially displaced about 180° relative to the cutting member of the next adjacent cutting member.

12. An apparatus as set forth in claim 3 characterized in that the discs of one delimbing tool are turned, suitably about 180°, around the axis of rotation relatively to the discs of the other delimbing tool.

13. An apparatus as set forth in claim 1 which includes counter-knives cooperating with the cutting member of the delimbing tools, said counter-knives being fixed relatively to the frame of the apparatus.

14. An apparatus as set forth in claim 1 which includes a platform that is disposed in a generally parallel relationship with delimbing tool and which is adapted to be raised and lowered.

15. An apparatus as set forth in claim 14 wherein that said platform is pivotally mounted on the frame of the apparatus by means of a pivotal axis that extends essentially parallel with the delimbing tool.

16. An apparatus as set forth in claim 1 wherein one end thereof is provided with means for cutting off the tree trunks to the desired length prior to the time that the tree trunks are introduced into the delimbing section.

17. A tree delimbing apparatus comprising in combination:
   a. a supporting frame,
   b. at least one rotatable delimbing tool provided on said supporting frame, each delimbing tool comprising:
      1. an elongated and horizontally disposed shaft extending substantially parallel with the tree trunk to be delimbed,
      2. a plurality of radially extending trunk abutting members located at spaced apart intervals along the length of said shaft,
      3. the composite peripheral contour of said radially extending trunk abutting members presenting an abutment envelope which limits the proximity of tree trunks to said horizontally disposed shaft, and
      4. a plurality of spaced apart cutting members located inwardly of said abutment envelope so that the cutting of trunks by said cutting members is minimized.

* * * * *